(12) United States Patent
Ota

(10) Patent No.: US 11,435,623 B2
(45) Date of Patent: Sep. 6, 2022

(54) LIQUID CRYSTAL DEVICE COMPRISING A PLURALITY OF ORIENTATION REGIONS THROUGH WHICH LIQUID CRYSTAL MOLECULES ARE CIRCULATED AND ELECTRONIC DEVICE

(71) Applicant: SEIKO EPSON CORPORATION, Tokyo (JP)

(72) Inventor: Takuya Ota, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/210,515

(22) Filed: Mar. 24, 2021

(65) Prior Publication Data
US 2021/0302769 A1    Sep. 30, 2021

(30) Foreign Application Priority Data
Mar. 26, 2020  (JP) .............................. JP2020-055572

(51) Int. Cl.
*G02F 1/1337*  (2006.01)
(52) U.S. Cl.
CPC ...... *G02F 1/133753* (2013.01); *G02F 1/1337* (2013.01); *G02F 1/133757* (2021.01); *G02F 1/13373* (2021.01); *G02F 1/133738* (2021.01); *G02F 1/133742* (2021.01); *G02F 1/133761* (2021.01)
(58) Field of Classification Search
CPC ......... G02F 1/133757; G02F 1/133761; G02F 1/133776; G02F 1/13373; G02F 1/133738; G02F 1/133742; G02F 1/133773
See application file for complete search history.

(56) References Cited

U.S. PATENT DOCUMENTS

| 2012/0154727 | A1* | 6/2012 | Chang | G02F 1/133707 349/129 |
| 2012/0314168 | A1* | 12/2012 | Kang | G02F 1/133723 349/124 |
| 2017/0052414 | A1* | 2/2017 | Cheng | G02F 1/133753 |

FOREIGN PATENT DOCUMENTS

| JP | 07294934 A | * | 11/1995 | ....... G02F 1/133753 |
| JP | H08194223 | | 7/1996 | |
| JP | 09073070 A | * | 3/1997 | ........... G02F 1/1323 |
| JP | 2007140008 | | 6/2007 | |
| JP | 2009031411 | | 2/2009 | |
| JP | 2012123144 | | 6/2012 | |

* cited by examiner

*Primary Examiner* — Paul C Lee
(74) *Attorney, Agent, or Firm* — JCIPRNET

(57) ABSTRACT

Included are a first orientation region in which a liquid crystal molecule is oriented along a first direction and a plurality of pixels are included; a second orientation region in which a liquid crystal molecule is oriented along a second direction intersecting the first direction and a plurality of pixels are included; a third orientation region in which a liquid crystal molecule is oriented along a third direction intersecting the second direction and opposite to the first direction and a plurality of pixels are included; and a fourth orientation region in which a liquid crystal molecule is oriented along a fourth direction intersecting the third direction and opposite to the second direction and a plurality of pixels are included.

3 Claims, 8 Drawing Sheets

LIQUID CRYSTAL DEVICE COMPRISING A PLURALITY OF ORIENTATION REGIONS THROUGH WHICH LIQUID CRYSTAL MOLECULES ARE CIRCULATED AND ELECTRONIC DEVICE

The present application is based on, and claims priority from JP Application Serial Number 2020-055572, filed on Mar. 26, 2020, the disclosure of which is hereby incorporated by reference herein in its entirety.

BACKGROUND

1. Technical Field

The present disclosure relates to a liquid crystal device and an electronic device.

2. Related Art

An active-drive type liquid crystal device that includes a pixel including a switching element has been known as a liquid crystal device. Such a liquid crystal device is used, for example, as a light valve of a projector serving as an electronic device.

For example, in a case of the liquid crystal device, when an intense light is emitted from the projector, liquid crystal molecules included in a liquid crystal layer are decomposed, which may generate, in the liquid crystal layer, impurity ion that causes a display failure. For example, JP-A-2007-140008 discloses a method in which a circulation flow path having a groove in a seal material is formed, and the inside of the liquid crystal layer is circulated by using a piezoelectric element pump provided in the circulation flow path.

However, JP-A-2007-140008 has a problem in which the liquid crystal device has a complicated configuration. In other words, there is a demand for a technique that reduces the display failure with a simplified configuration.

SUMMARY

A liquid crystal device includes a first orientation region in which a liquid crystal molecule is oriented along a first direction and a plurality of pixels are included, a second orientation region in which a liquid crystal molecule is oriented along a second direction intersecting the first direction and a plurality of pixels are included, a third orientation region in which a liquid crystal molecule is oriented along a third direction intersecting the second direction and opposite to the first direction and a plurality of pixels are included, and a fourth orientation region in which a liquid crystal molecule is oriented along a fourth direction intersecting the third direction and opposite to the second direction and a plurality of pixels are included.

A liquid crystal device includes, outside a pixel area, a first orientation region in which a liquid crystal molecule is oriented along a first direction, and a second orientation region in which a liquid crystal molecule is oriented along a second direction intersecting the first direction, also includes, in the pixel area, a third orientation region in which a liquid crystal molecule is oriented along a third direction intersecting the first direction and the second direction such that the liquid crystal molecule moves from the second orientation region to the first orientation region, and further includes, outside the pixel area, a fourth orientation region in which a liquid crystal molecule is oriented along the first direction, the fourth orientation region being opposed to the first orientation region with the third orientation region interposed between the first orientation region and the fourth orientation region, and a fifth orientation region in which a liquid crystal molecule is oriented along the second direction, the fifth orientation region being opposed to the second orientation region with the third orientation region interposed between the second orientation region and the fifth orientation region.

A liquid crystal device includes a first orientation region in which a liquid crystal molecule is oriented along a predetermined rotational direction in plan view and a plurality of pixels are included, and a second orientation region in which a liquid crystal molecule is oriented along the rotational direction in plan view and a plurality of pixels are included, the second orientation region being disposed outside the first orientation region.

An electronic device includes the liquid crystal device described above.

DESCRIPTION OF EXEMPLARY EMBODIMENTS

First Embodiment

Figure 1:
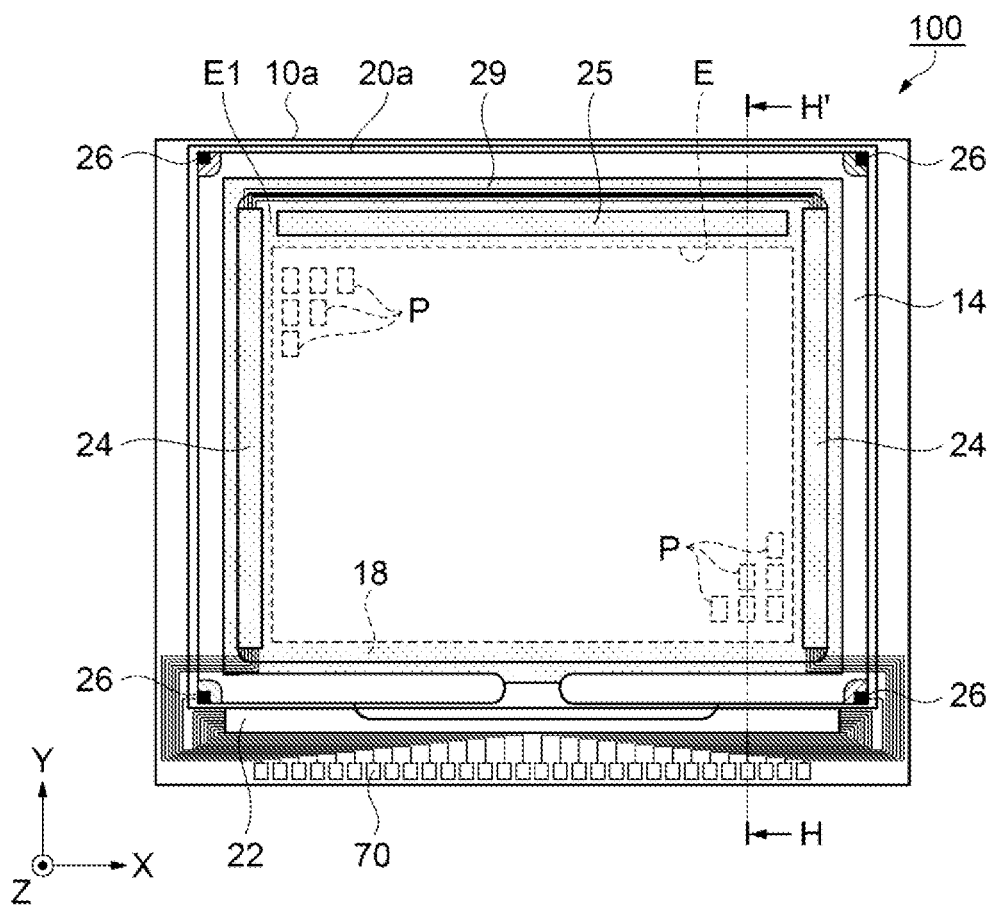
FIG. 1 is a schematic plan view illustrating a configuration of a liquid crystal device according to a first embodiment.
Figure 2:
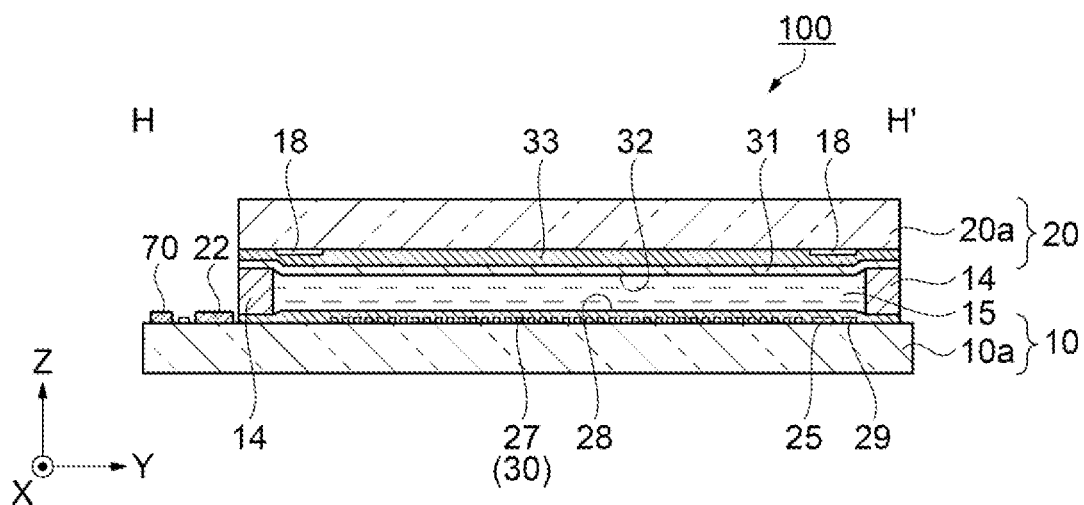
FIG. 2 is a schematic cross-sectional view taken along line H-H' of the liquid crystal device illustrated in FIG. 1.

As illustrated in FIGS. 1 and 2, a liquid crystal device 100 according to the present embodiment includes an element substrate 10 and a counter substrate 20, which are disposed so as to be opposed to each other, and also includes a liquid crystal layer 15 serving as an electro-optical layer and interposed between these paired substrates. For example, glass, quartz, or the like is used for a first substrate 10a serving as a substrate that forms the element substrate 10 and a second substrate 20a that forms the counter substrate 20.

The element substrate 10 is larger than the counter substrate 20. These substrates are joined to each other through a seal material 14 disposed along the outer periphery of the counter substrate 20. A liquid crystal having positive or negative dielectric anisotropy is enclosed in a space between them to form the liquid crystal layer 15.

For example, an adhesive such as thermosetting or ultraviolet curing epoxy resin is used for the seal material 14. For example, a spacer is mixed in the seal material 14 to maintain a constant space between the paired substrates.

A display region E in which a plurality of pixels P that contribute to displaying is arranged is provided on the inner side of the seal material 14. A peripheral area E1 provided with a peripheral circuit or the like that does not contribute to displaying is disposed around the display region E.

A data-line drive circuit 22 is provided between one side portion of the element substrate 10 and the seal material 14 located along this one side portion. Furthermore, an inspection circuit 25 is provided between the display region E and the seal material 14 located along another one side portion opposed to the one side portion. In addition, a scanning line drive circuit 24 is provided between the display region E and the seal material 14 located along other two side portions intersecting the one side portion at right angles and opposed to each other. In addition, a plurality of wiring lines 29 that couple the two scanning line drive circuits 24 is provided between the inspection circuit 25 and the seal material 14 located along the other one side portion opposed to the one side portion.

A light shielding film 18 having a frame shape similar to the seal material 14 is provided on an inner side of the seal material 14 disposed in a frame manner on the counter substrate 20 side. The light shielding film 18 is made out, for example, of a metal or metallic oxide having a light reflection property. The display region E having a plurality of pixels P is formed on the inner side of the light shielding film 18. For example, tungsten silicide (WSi) can be used for the light shielding film 18.

The wiring lines coupled to the data-line drive circuit 22 and the scanning line drive circuits 24 are coupled to a plurality of external connection terminals 70 arranged along the one side portion. In the description below, the X direction represents a direction extending along the one side portion, and the Y direction represents a direction extending along other two side portions intersecting the one side portion at right angles and opposed to each other. In addition, the view from the Z direction is referred to as plan view.

As illustrated in FIG. 2, the surface of the first substrate 10a on the liquid crystal layer 15 side includes a pixel electrode 27 having a light reflection property and provided for each of the pixels P, a thin film transistor (hereinafter, referred to as a "transistor 30") serving as a switching element, a data line (not illustrated), and a first orientation film 28 that covers these elements.

The pixel electrode 27 is an electrically conductive transparent film, for example, made of indium tin oxide (ITO) or the like. The element substrate 10 according to the present disclosure includes, at least, the pixel electrode 27, the transistor 30, and the first oriented film 28.

The surface of the counter substrate 20 on the liquid crystal layer 15 side includes the light shielding film 18, an insulating layer 33 formed in a form of film so as to cover the light shielding film 18, a common electrode 31 provided so as to cover the insulating layer 33, and a second orientation film 32 that covers the common electrode 31. The counter substrate 20 according to the present disclosure includes, at least, the light shielding film 18, the common electrode 31, and the second orientation film 32.

The light shielding film 18 surrounds the display region E as illustrated in FIG. 1, and is provided at a position that overlaps with the scanning line drive circuit 24 and the inspection circuit 25 in plan view. This makes it possible for the light shielding film 18 to block light entering the peripheral circuits including these drive circuits from the counter substrate 20 side, thereby functioning to prevent the peripheral circuits from malfunctioning due to the light. In addition, the light shielding film 18 blocks light so that unnecessary stray light does not enter the display region E, thereby achieving high contrast in display at the display region E.

The insulating layer 33 is made, for example, of an inorganic material such as silicon oxide ($SiO_2$), and has optical transparency. The insulating layer 33 is provided so as to cover the light shielding film 18. A method of forming such an insulating layer 33 includes a film forming method using a chemical vapor deposition (CVD) method, for example.

The common electrode 31 is an electrically conducting transparent film made, for example, of ITO. In addition, the common electrode 31 covers the insulating layer 33 and is electrically coupled to the wiring line on the element substrate 10 side through up-down electrically continuous portions 26 provided at four corners of the counter substrate 20 as illustrated in FIG. 1.

The first oriented film 28 that covers the pixel electrode 27 and the second oriented film 32 that covers the common electrode 31 are selected on the basis of optical design of the liquid crystal device 100. The first oriented film 28 and the second oriented film 32 include an inorganic alignment film obtained by using a vapor deposition method to form a film of an inorganic material such as silicon oxide and orienting the film substantially vertically with respect to liquid crystal molecules having negative dielectric anisotropy.

Such a liquid crystal device 100 has a transmission type, and employs a normally white mode or normally black mode in terms of the optical design. In the normally white mode, the transmittance of a pixel P when no voltage is applied is greater than the transmittance when a voltage is applied. In the normally black mode, the transmittance of a pixel P when no voltage is applied is smaller than the transmittance when a voltage is applied. In use, a polarizing element is disposed at each of the light entrance side and the light exit side so as to correspond to the optical design.

Figure 3:
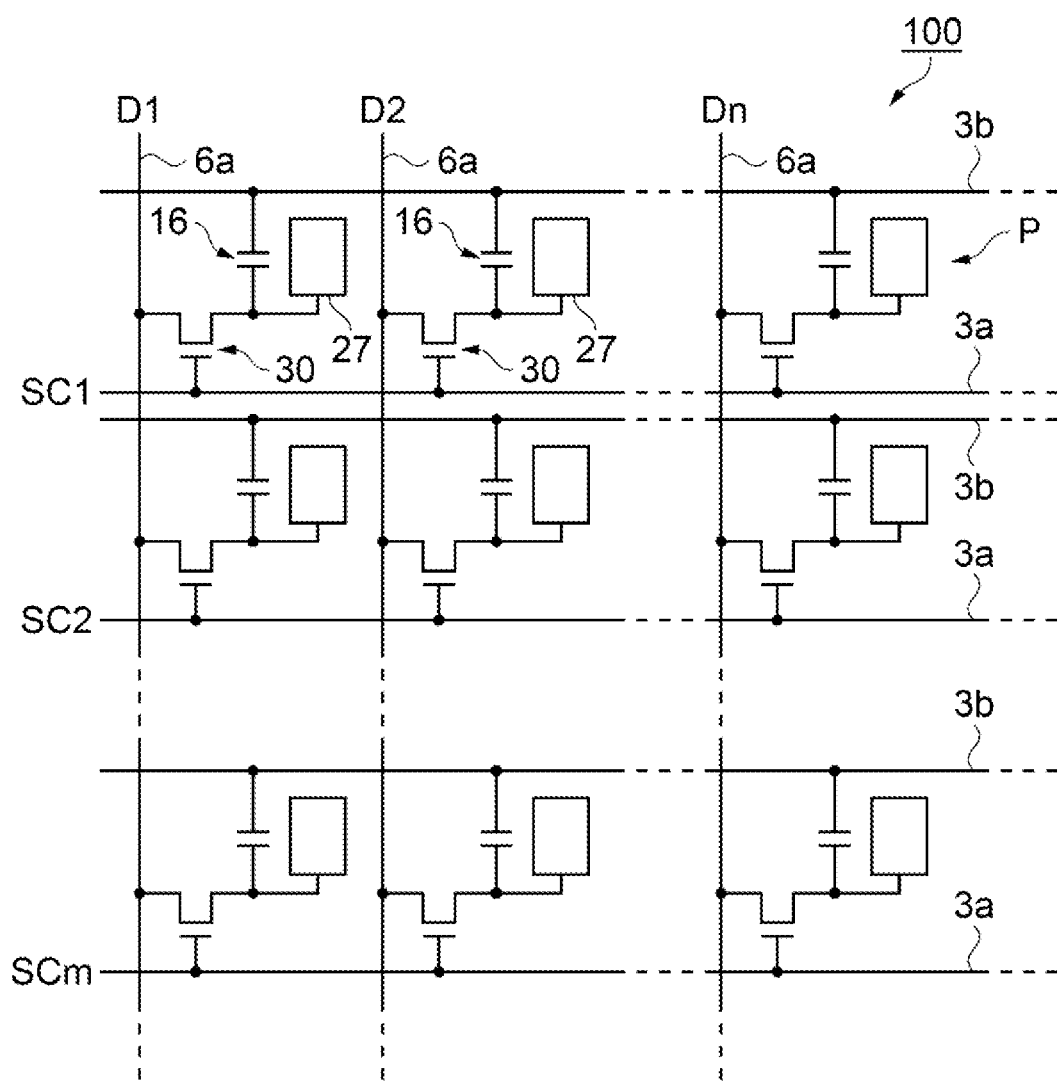
FIG. 3 is an equivalent circuit diagram illustrating an electrical configuration of the liquid crystal device.

As illustrated in FIG. 3, the liquid crystal device 100 includes a plurality of scanning lines 3a and the plurality of data lines 6a, which are insulated from each other at least in the display region E and are perpendicular to each other, and also includes a capacitance line 3b. For example, the X direction is a direction in which the scanning lines 3a extend, and the Y direction is a direction in which the data lines 6a extend.

The scanning line 3a, the data line 6a, the capacitance line 3b, the pixel electrode 27, the transistor 30, and the capacitance element 16 are provided to form a pixel circuit of a pixel P. The pixel electrode 27, the transistor 30, and the capacitance element 16 are provided in a region defined by the signal lines of the scanning line 3a, the data line 6a, and the capacitance line 3b.

The scanning line 3a is electrically coupled to a gate of the transistor 30. The data line 6a is electrically coupled to a source region of the transistor 30. The pixel electrode 27 is electrically coupled to the drain region of the transistor 30.

The data line 6a is coupled to the data-line drive circuit 22 (see FIG. 1) to supply the pixel P with image signals D1, D2, . . . , Dn supplied from the data-line drive circuit 22. The scanning line 3a is coupled to the scanning line drive circuit 24 (see FIG. 1) to supply each of the pixels P with scanning signals SC1, SC2, . . . , SCm supplied from the scanning line drive circuit 24.

The image signals D1 to Dn supplied from the data-line drive circuit 22 to the data line 6a may be supplied in this order in a line sequential manner, or may be supplied on a group-by-group basis, the group being comprised of a plurality of data lines 6a adjacent to each other. The scanning line drive circuit 24 supplies, in a line sequential manner, the scanning line 3a with the scanning signals SC1 to SCm in a form of pulse at predetermined timing.

The liquid crystal device 100 is configured such that, upon input of the scanning signals SC1 to SCm, the transistor 30 serving as a switching element is brought into an ON state only for a certain period, which causes the image signals D1 to Dn supplied from the data line 6a to be written in a pixel electrode 27 at predetermined timing. In addition, the image signals D1 to Dn written at a certain level in the liquid crystal layer 15 through the pixel electrode 27 are retained for a certain period of time between the pixel electrode 27 and the common electrode 31 disposed so as to be opposed to the pixel electrode 27 with the liquid crystal layer 15 being interposed therebetween.

In order to prevent the retained image signals D1 to Dn from leaking, the capacitance element 16 is coupled in parallel with a liquid crystal capacitor formed between the pixel electrode 27 and the common electrode 31. The capacitance element 16 has a dielectric layer serving as a capacitor film between two capacitor electrodes.

Figure 4:
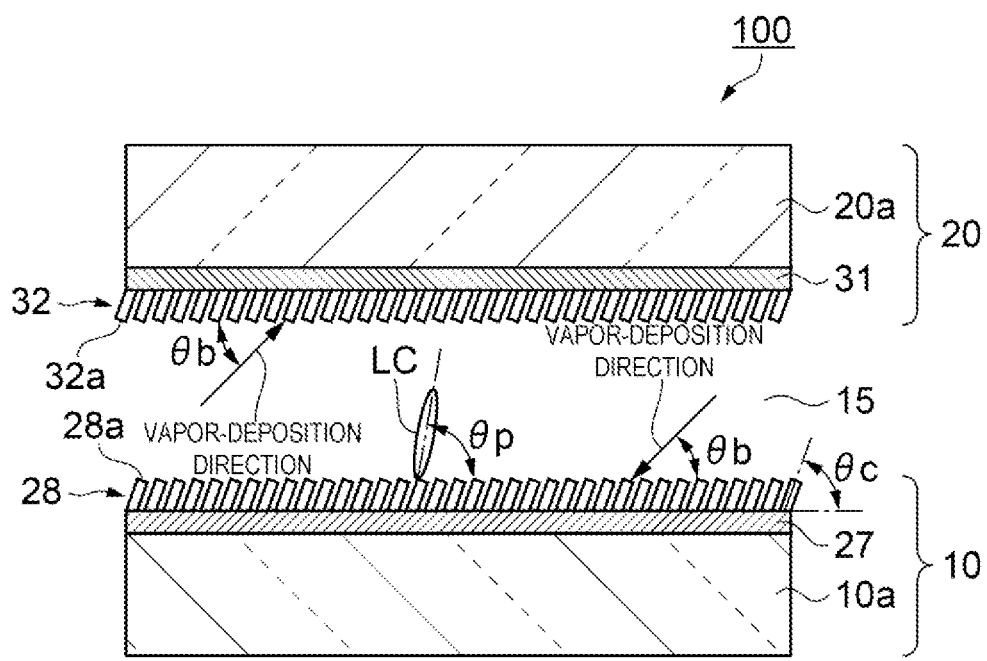
FIG. 4 is a cross-sectional view illustrating a state of an oriented film.

As illustrated in FIG. 4, the first oriented film 28 and the second oriented film 32 are formed at the surface of the element substrate 10 and the surface of the counter substrate 20. The first oriented film 28 and the second oriented film 32 are obtained through diagonal vapor deposition of silicon oxide using, for example, vacuum deposition that is one example of physical vapor deposition. The angle $\theta b$ of vapor deposition in the diagonal vapor deposition is, for example, 45°. This causes crystals of silicon oxide to grow in a columnar manner at the surfaces of the element substrate 10 and the counter substrate 20. The columnar crystal that has grown in a columnar manner is referred to as a column 28a, 32a. The first oriented film 28 is a group of columns 28a. The second oriented film 32 is a group of columns 32a.

The angles $\theta c$ of growth of the columns 28a, 32a are not necessarily equal to the angle $\theta b$ of vapor deposition, and are, for example, 70°. At the surfaces of the first oriented film 28 and the second oriented film 32, a pre-tilt angle $\theta p$ of substantially vertically oriented liquid crystal molecules LC is, for example, 85°. In addition, the direction of pre-tilt, in other words, the azimuth angle direction of the liquid crystal molecules LC when viewed from the substrate surfaces of the element substrate 10 and the counter substrate 20 is equal to a planar vapor-deposition direction in the diagonal vapor deposition at the first oriented film 28 and the second oriented film 32.

Figure 5:
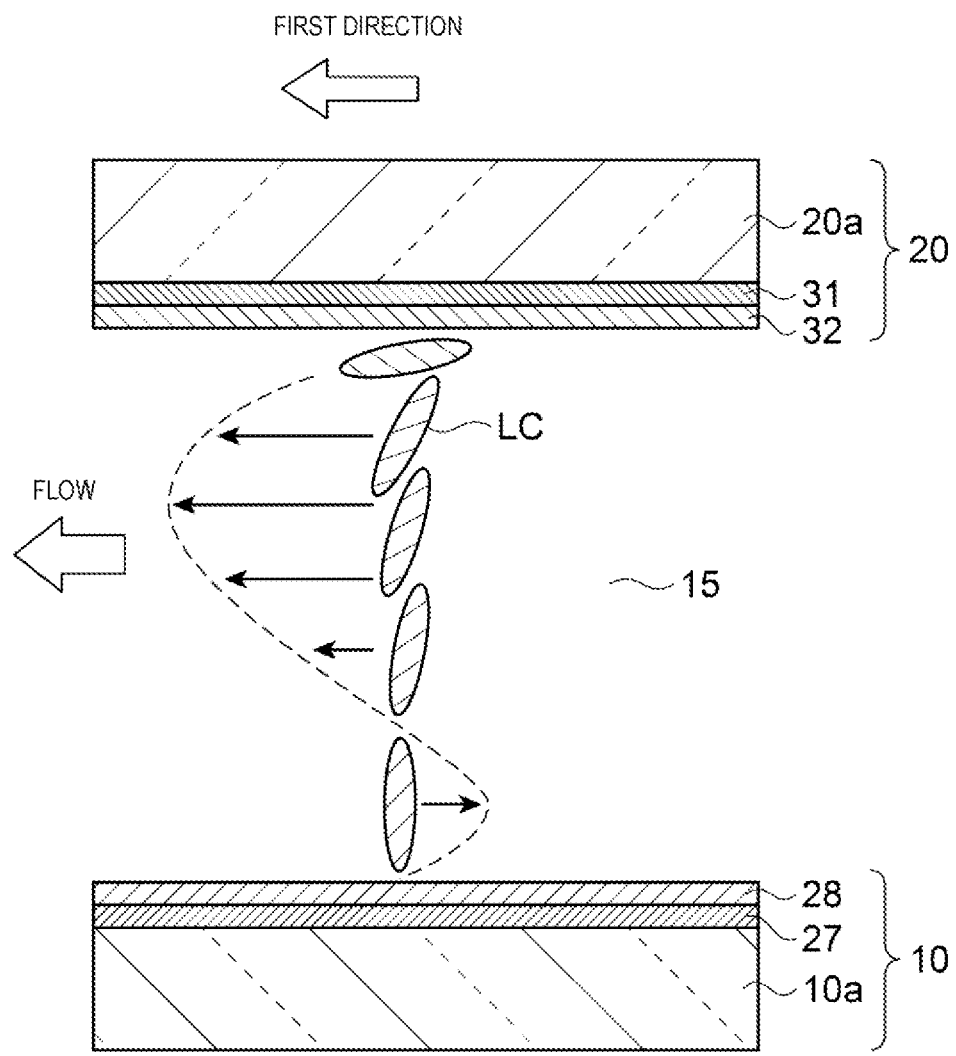
FIG. 5 is a cross-sectional view illustrating an orientation state and a velocity distribution of liquid crystal molecules.

The angle $\theta p$ of pre-tilt of the liquid crystal molecules LC is set to differ between the element substrate 10 side and the counter substrate 20 side, as illustrated in FIG. 5. Then, a drive voltage is applied across the pixel electrode 27 and the common electrode 31 to drive the liquid crystal layer 15. This makes the liquid crystal molecules LC lean toward the azimuth angle direction of pre-tilt. As the liquid crystal layer 15 repeats drive (ON/OFF), the liquid crystal molecules LC repeats a behavior of leaning toward the azimuth angle direction of pre-tilt and returning to the initial orientation state.

At this time, the direction of the liquid crystal molecules changes to cause the liquid crystal molecules LC in the liquid crystal layer 15 to circulate. In other words, a flow occurs in the liquid crystal layer 15, that is, a phenomenon called a back-flow effect occurs. When an orientating process along the first direction is applied as illustrated in FIG. 5, a flow toward the first direction occurs in the liquid crystal layer 15. Next, the direction of circulation occurring in the liquid crystal layer 15 of the liquid crystal device 100 according to the first embodiment will be described with reference to FIGS. 6 and 7.

Figure 6:
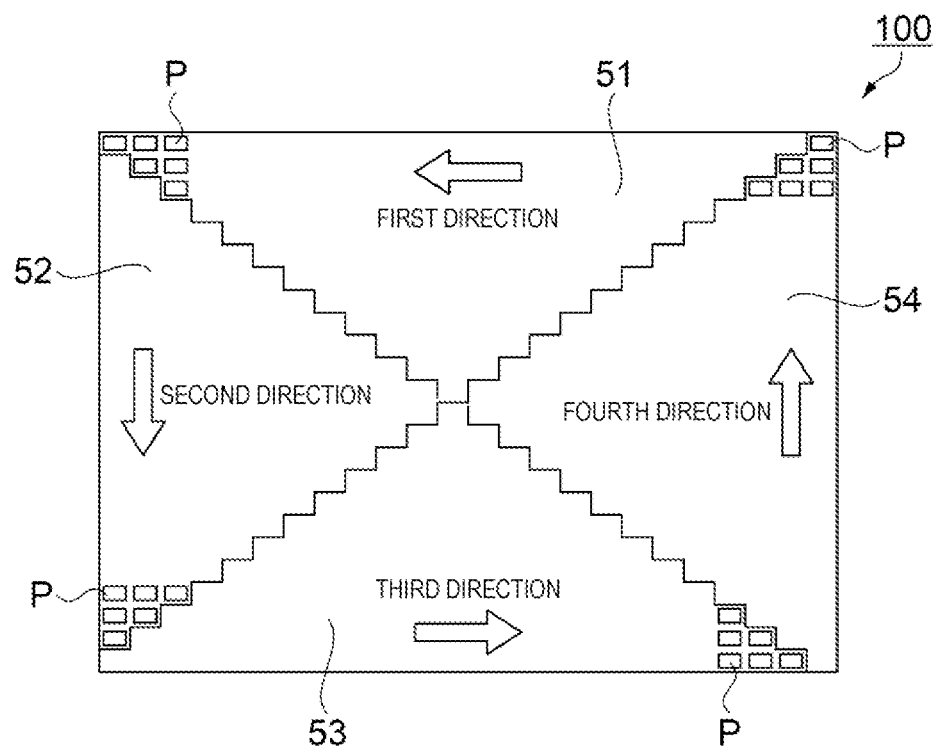
FIG. 6 is a plan view illustrating orientation directions in the liquid crystal device.

FIG. 6 is a plan view when the liquid crystal device 100 is viewed from the counter substrate 20 side. As illustrated in FIG. 6, the liquid crystal device 100 includes a first orientation region 51 in which the liquid crystal molecules LC are oriented along the first direction and a plurality of pixels P is included. Furthermore, the liquid crystal device 100 includes a second orientation region 52 in which the liquid crystal molecules LC are oriented along the second direction intersecting the first direction, and a plurality of pixels P is included. In addition, the liquid crystal device 100 includes a third orientation region 53 in which the liquid crystal molecules LC are oriented along the third direction intersecting the second direction and opposite to the first direction, and a plurality of pixels P is included. Furthermore, the liquid crystal device 100 includes a fourth orientation region 54 in which the liquid crystal molecules LC are oriented along the fourth direction intersecting the third direction and opposite to the second direction, and a plurality of pixels P is included.

Specifically, in the first orientation region 51, the diagonal vapor deposition process is applied to the first oriented film 28 (see FIGS. 4 and 5) and along a direction opposite to the first direction in plan view, and the diagonal vapor deposition process is applied to the second oriented film 32 (see FIGS. 4 and 5) and along the first direction. In other words, the vapor-deposition direction of the first oriented film 28 and the vapor-deposition direction of the second oriented film 32 are opposite to each other and differ from each other. In addition, similarly, in the second orientation region 52, a diagonal vapor deposition process is applied to the first oriented film 28 (see FIGS. 4 and 5) and along a direction opposite to the second direction in plan view, and a diagonal vapor deposition process is applied to the second oriented film 32 and along the second direction. Furthermore, in the third orientation region 53, a diagonal vapor deposition process is applied to the first oriented film 28 (see FIGS. 4 and 5) and along a direction opposite to the third direction in plan view, and a diagonal vapor deposition process is applied to the second oriented film 32 and along the third direction. In addition, in the fourth orientation region 54, a diagonal vapor deposition process is applied to the first oriented film 28 (see FIGS. 4 and 5) and along a direction opposite to the fourth direction in plan view, and a diagonal vapor deposition process is applied to the second oriented film 32 and along the fourth direction. Note that, for example, by using different methods of silane coupling treatment performed after the diagonal vapor deposition process between the first oriented film 28 and the second oriented film 32, it is possible to make the pre-tilt angle $\theta p$ of the liquid crystal molecules LC differ between the element substrate 10 side and the counter substrate 20 side.

Figure 7:
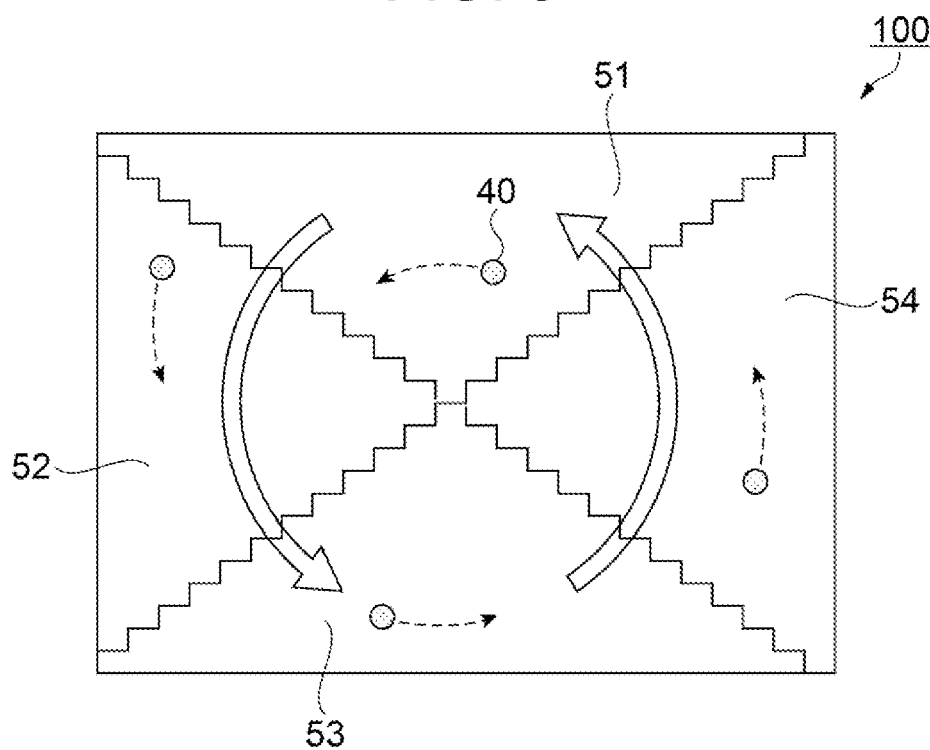
FIG. 7 is a plan view illustrating a circulation direction of the liquid crystal molecules.

By applying a voltage across the pixel electrode 27 and the common electrode 31 of the liquid crystal device 100 to which the orientating process is applied in such directions, it is possible to cause the liquid crystal molecules LC of the liquid crystal layer 15 to circulate as illustrated in FIG. 7. FIG. 7 is a plan view when the liquid crystal device 100 is viewed from the counter substrate 20 side.

Specifically, upon application of a voltage to the plurality of pixels P, it is possible to cause the liquid crystal molecules LC to circulate in the order of the first orientation region 51, the second orientation region 52, the third orientation region 53, and the fourth orientation region 54. This makes it possible to diffuse impurity ion 40 existing together with the liquid crystal molecules LC in the liquid crystal layer 15. In other words, it is possible to prevent the impurity ion 40 from gathering at one location in the liquid crystal layer 15. This makes it possible to suppress occurrence of a display failure due to gathering of the impurity ion 40. In addition, with the simplified structure in which the first orientation region 51 to the fourth orientation region 54 are provided, it is possible to diffuse the impurity ion 40. Moreover, the liquid crystal molecules LC are less likely to be damaged, and hence, it is possible to prolong life of the liquid crystal device 100.

Figure 8:
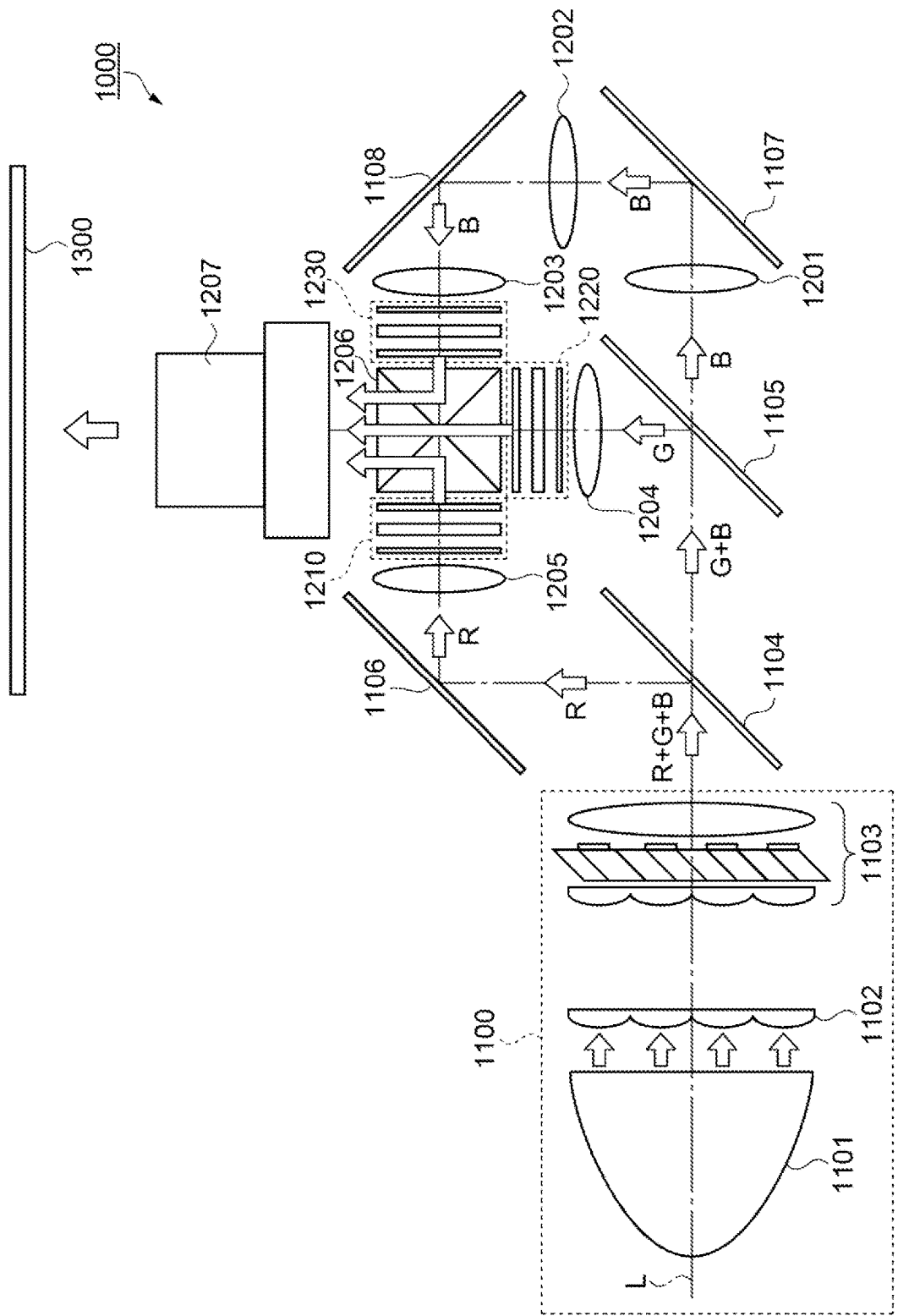
FIG. 8 is a schematic view illustrating a configuration of a projector serving as an electronic device.

As illustrated in FIG. 8, a projector 1000 according to the present embodiment includes: a polarized light illumination device 1100 disposed so as to align with a system optical axis L; two dichroic mirrors 1104 and 1105 each serving as a light separating element; three reflecting mirrors 1106, 1107, and 1108; five relay lens 1201, 1202, 1203, 1204, and 1205; transmission-type liquid crystal light valves 1210, 1220, 1230 serving as three light modulators; a cross dichroic prism 1206 serving as a light combining element; and a projection lens 1207.

The polarized light illumination device 1100 generally includes a lamp unit 1101 serving as a light source including a white light source such as an extra-high pressure mercury lamp or a halogen lamp, an integrator lens 1102, and a polarization conversion element 1103.

The dichroic mirror 1104 reflects the red light (R) of a polarized light flux outputted from the polarized light illumination device 1100, and transmits the green light (G) and the blue light (B). The other dichroic mirror 1105 reflects the green light (G) transmitted through the dichroic mirror 1104, and transmits the blue light (B).

The red light (R) reflected by the dichroic mirror 1104 is reflected by the reflection mirror 1106, and then enters the liquid crystal light valve 1210 via the relay lens 1205. The green light (G) reflected by the dichroic mirror 1105 enters the liquid crystal light valve 1220 via the relay lens 1204. The blue light (B) transmitted through the dichroic mirror 1105 passes through a light guide system including the three relay lenses 1201, 1202, and 1203 and the two reflecting mirrors 1107 and 1108, and enters the liquid crystal light valve 1230.

The liquid crystal light valves 1210, 1220, and 1230 are disposed so as to be opposed to incident surfaces of corresponding dichroic prisms 1206 for individual color lights. The color lights entering the liquid crystal light valves 1210, 1220, and 1230 are modulated on the basis of video information (video signal), and are outputted toward the cross dichroic prism 1206.

This prism includes four rectangular prisms bonded together. On the inner surfaces of the prisms, a dielectric multilayer film configured to reflect the red light and a dielectric multilayer film configured to reflect the blue light are formed in a cross shape. These dielectric multilayer films combine the three types of color light to combine lights representing color images. The combined light is projected onto the screen 1300 through the projection lens 1207 serving as a projection optical system, and the image is enlarged to be displayed.

The liquid crystal light valve 1210 is an element to which the liquid crystal device 100 described above is applied. Note that it is also possible to apply liquid crystal devices 200, 300 that will be described later. The liquid crystal device 100 is disposed at a space between a pair of polarizing elements disposed in a cross-Nicols state at the entrance side and the exit side of color light. This similarly applies to other liquid crystal light valves 1220 and 1230.

Note that, in addition to the projector 1000, the electronic device on which the liquid crystal device 100 is mounted includes a head-up display (HUD), a head-mounted display (HMD), a smartphone, an electrical view finder (EVF), a mobile mini-projector, an electronic book, a mobile phone, a mobile computer, a digital camera, a digital video camera, a display, a vehicle mounted unit, an audio unit, an exposing unit, and an illumination device. The liquid crystal device 100 can be used in various types of electronic devices.

As described above, the liquid crystal device 100 according to the first embodiment includes: the first orientation region 51 in which the liquid crystal molecule LC is oriented along the first direction and a plurality of pixel P is included; the second orientation region 52 in which the liquid crystal molecule LC is oriented along the second direction intersecting the first direction and the plurality of pixels P is included; the third orientation region 53 in which the liquid crystal molecule LC is oriented along the third direction intersecting the second direction and opposite to the first direction and the plurality of pixels P is included; and the fourth orientation region 54 in which the liquid crystal molecule LC is oriented along the fourth direction intersecting the third direction and opposite to the second direction and the plurality of pixel P is included.

With this configuration, upon application of a voltage to the plurality of pixels P, it is possible to cause the liquid crystal molecules LC to circulate in the order of the first orientation region 51, the second orientation region 52, the third orientation region 53, and the fourth orientation region 54. This makes it possible to prevent the impurity ion 40 existing together with the liquid crystal molecules LC from gathering at one location, thereby being able to diffuse the impurity ion 40. As described above, with the simplified structure in which a plurality of orientation regions is provided, it is possible to cause the impurity ion 40 to circulate in the liquid crystal layer 15 without using other members, which makes it possible to suppress the display failure.

In addition, the projector 1000 includes the liquid crystal device 100 described above, which makes it possible to provide the projector 1000 exhibiting high display quality.

Second Embodiment

Figure 9:
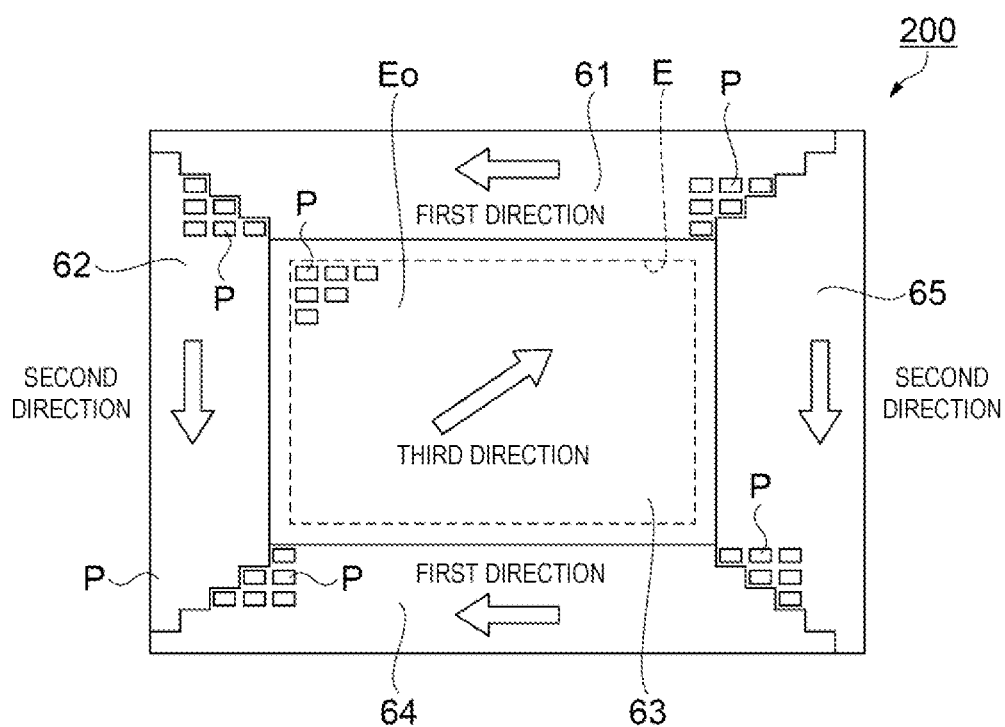
FIG. 9 is a plan view illustrating an orientation direction in a liquid crystal device according to a second embodiment.

A liquid crystal device 200 according to a second embodiment differs from the liquid crystal device 100 according to the first embodiment in terms of the direction of orientation of the liquid crystal molecules LC, as illustrated in FIG. 9. The other configuration is generally similar. Thus, in the second embodiment, portions differing from the first embodiment will be described in detail, and other overlapping portions will not be repeated as appropriate.

The liquid crystal device 200 according to the second embodiment includes, outside a pixel area E0 including the display region E: a first orientation region 61 in which the liquid crystal molecule LC is oriented along a first direction; and a second orientation region 62 in which the liquid crystal molecule LC is oriented along a second direction intersecting the first direction.

In addition, the liquid crystal device 200 includes, in the pixel area E0, a third orientation region 63 in which the liquid crystal molecule LC is oriented along a third direction intersecting the first direction and the second direction so that the liquid crystal molecule LC moves from the second orientation region 62 to the first orientation region 61.

In addition, the liquid crystal device 200 includes, outside the pixel area E0: a fourth orientation region 64 in which the liquid crystal molecule LC is oriented along the first direction, the fourth orientation region 64 being opposed to the first orientation region 61 with the third orientation region 63 being interposed between the first orientation region 61 and the fourth orientation region 64; and a fifth orientation region 65 in which the liquid crystal molecule LC is oriented along the second direction, the fifth orientation region 65 being opposed to the second orientation region 62 with the third orientation region 63 being interposed between the second orientation region 62 and the fifth orientation region 65.

A method of diagonal vapor deposition applied to the first oriented film 28 and the second oriented film 32 in each of the regions 61 to 65 of the liquid crystal device 200 is similar to that in the first embodiment.

Figure 10:
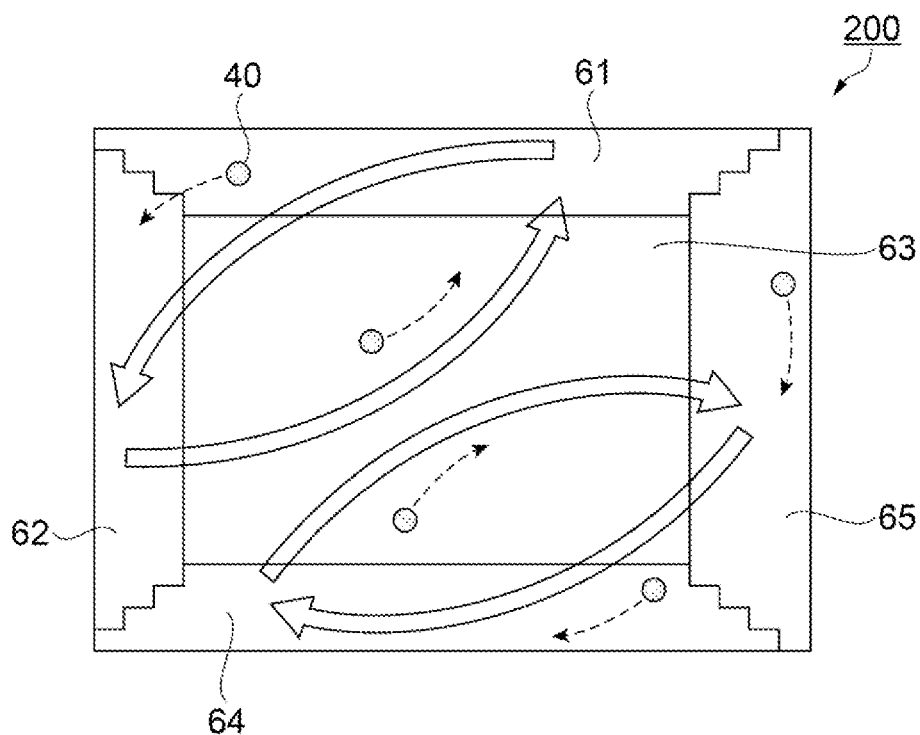
FIG. 10 is a plan view illustrating a circulation direction of liquid crystal molecules.

Upon application of a voltage across the pixel electrode 27 and the common electrode 31 of the liquid crystal device 200 according to the second embodiment to which an orientating process is applied in such directions, it is possible to cause the liquid crystal molecules LC in the liquid crystal layer 15 to circulate as illustrated in FIG. 10. FIG. 10 is a plan view when the liquid crystal device 200 is viewed from the counter substrate 20 side.

Specifically, upon application of a voltage to the plurality of pixels P, it is possible to cause the liquid crystal molecules LC to circulate in the order of the first orientation region 61, the second orientation region 62, and the third orientation region 63, and also to circulate in the order of the fifth orientation region 65, the fourth orientation region 64, and the third orientation region 63. In other words, it is possible to cause the liquid crystal molecules LC to flow with two circles: a circle in a clockwise direction from the third direction in plan view and a circle in a counterclockwise direction from the third direction. This makes it possible to prevent the impurity ion 40 from gathering at one location, thereby being able to diffuse the impurity ion 40.

As described above, the liquid crystal device 200 according the second embodiment includes, outside the pixel area E0: the first orientation region 61 in which the liquid crystal molecule LC is oriented along the first direction; and the second orientation region 62 in which the liquid crystal molecule LC is oriented along the second direction intersecting the first direction. The liquid crystal device 200 according to the second embodiment also includes, in the pixel area E0: the third orientation region 63 in which the liquid crystal molecule LC is oriented along the third direction intersecting the first direction and the second direction such that the liquid crystal molecule LC moves from the second orientation region 62 to the first orientation region 61. In addition, the liquid crystal device 200 according to the second embodiment also includes, outside the pixel area E0: the fourth orientation region 64 in which the liquid crystal molecule LC is oriented along the first direction, the fourth orientation region 64 being opposed to the first orientation region 61 with the third orientation region 63 being interposed between the first orientation region 61 and the fourth orientation region 64; and the fifth orientation region 65 in which the liquid crystal molecule LC is oriented along the second direction, the fifth orientation region 65 being opposed to the second orientation region 62 with the third orientation region 63 being interposed between the second orientation region 62 and the fifth orientation region 65.

With this configuration, upon application of a voltage to the plurality of pixels P, it is possible to cause the liquid crystal molecules LC to circulate in the order of the first orientation region 61, the second orientation region 62, and the third orientation region 63, and also to circulate in the order of the fifth orientation region 65, the fourth orientation region 64, and the third orientation region 63. In other words, it is possible to create flows of the liquid crystal molecules LC in a clockwise direction from the third direction in plan view and in a counterclockwise direction from the third direction. This makes it possible to prevent the impurity ion 40 from gathering at one location, thereby being able to diffuse the impurity ion 40.

Third Embodiment

Figure 11:
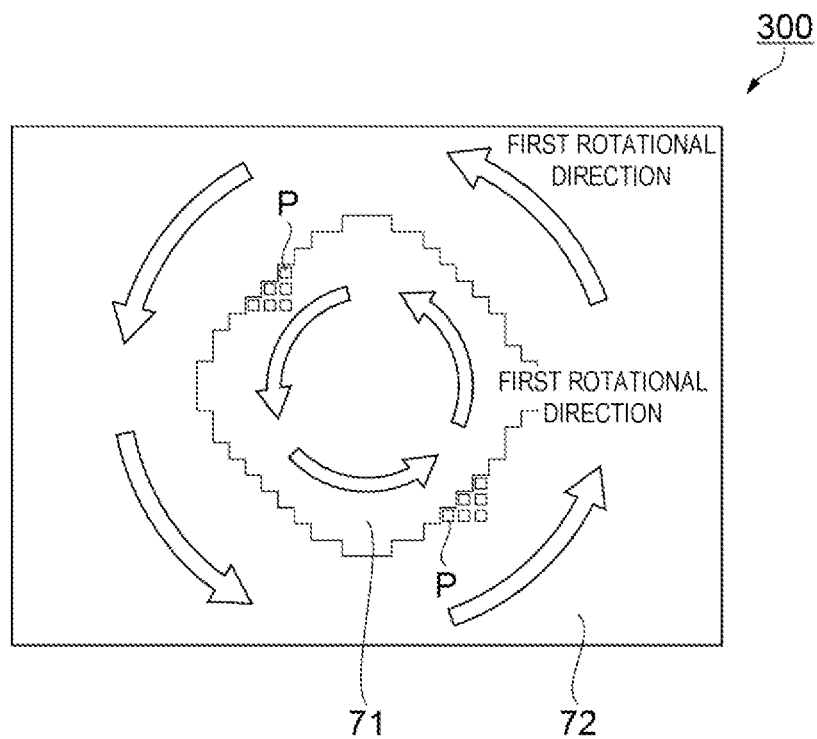
FIG. 11 is a plan view illustrating an orientation direction in a liquid crystal device according to a third embodiment.

A liquid crystal device 300 according to a third embodiment differs from the liquid crystal device 100 according to the first embodiment or the liquid crystal device 200 according to the second embodiment in terms of the direction of orientation of the liquid crystal molecules LC, as illustrated in FIG. 11. The other configuration is generally similar to each other. Thus, in the third embodiment, portions differing from the first embodiment will be described in detail, and other overlapping portions will not be repeated as appropriate.

The liquid crystal device 300 according to the third embodiment includes a first orientation region 71 in which a liquid crystal molecule LC is oriented along a first rotational direction serving as a predetermined rotational direction in plan view and a plurality of pixels P is included. In addition, the liquid crystal device 300 includes, outside the first orientation region 71, a second orientation region 72 in which a liquid crystal molecule LC is oriented along the first rotational direction in plan view and a plurality of pixels P is included.

The first oriented film 28 and the second oriented film 32 in the first orientation region 71 and the second orientation region 72 of the liquid crystal device 300 are each made out, for example, of organic material such as polyimide, and are formed through a rubbing process applied in directions differing from each other in plan view. In addition, as in the first embodiment, the pre-tilt angle θp of liquid crystal molecule LC differs between the element substrate 10 side and the counter substrate 20 side.

Figure 12:
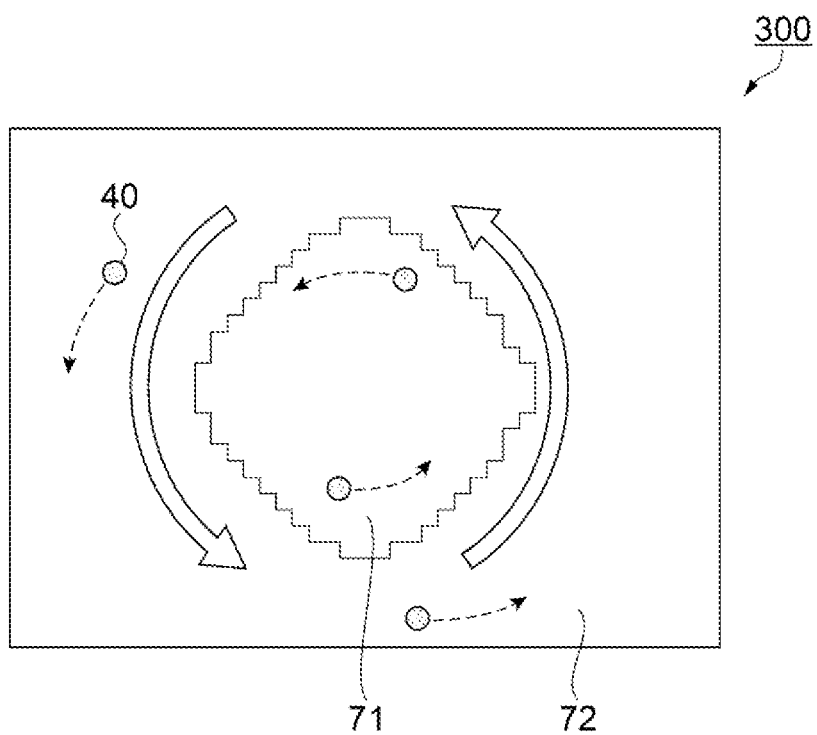
FIG. 12 is a plan view illustrating a circulation direction of liquid crystal molecules.

Upon application of a voltage across the pixel electrode 27 and the common electrode 31 of the liquid crystal device 300 according to the third embodiment to which the orientating process is applied as described above, it is possible to cause the liquid crystal molecules LC in the liquid crystal layer 15 to circulate as illustrated in FIG. 12. FIG. 12 is a plan view when the liquid crystal device 300 is viewed from the counter substrate 20 side.

Specifically, upon application of a voltage to the plurality of pixels P, it is possible to cause the liquid crystal molecules LC to circulate along the first rotational direction. This makes it possible to prevent the impurity ion 40 from gathering at one location, thereby being able to diffuse the impurity ion 40.

As described above, the liquid crystal device 300 according to the third embodiment includes the first orientation region 71 in which the liquid crystal molecule LC is oriented along the first rotational direction in plan view and the plurality of pixels P is included, and also includes, outside the first orientation region 71, the second orientation region 72 in which the liquid crystal molecule LC is oriented along the first rotational direction in plan view and the plurality of pixels P is included.

With this configuration, upon application of a voltage to the plurality of pixels P, it is possible to cause the liquid crystal molecules LC to circulate along the first rotational direction. This makes it possible to prevent the impurity ion 40 from gathering at one location, thereby being able to diffuse the impurity ion 40.

It should be noted that the direction in which the liquid crystal molecules LC are caused to circulate is not limited to those in the embodiments described above. For example, it may be possible to apply, to the liquid crystal device 100 according to the first embodiment, an orientating process that causes a circulation in the order of the fourth direction, the third direction, the second direction, and the first direction. In addition, it may be possible to apply, to the liquid crystal device 200 according to the second embodiment, an orientating process that causes a circulation in the opposite directions, or an orientating process that causes a circulation with three or more circles, rather than two circles. Furthermore, it may be possible to apply, to the liquid crystal device 300 according to the third embodiment, an orientating process that causes a circulation in a direction opposite to the first rotational direction.

Furthermore, the regions used to partition the direction of orientation are not limited to those in the embodiments described above, and may be further finely divided or reduced.

In addition, the orientating process is not limited to the process in which the diagonal vapor deposition process is applied to the liquid crystal device 100, 200, or the rubbing process is applied to the liquid crystal device 300. Either process may be used, or other methods may be used.

What is claimed is:

1. A liquid crystal device comprising:
   a first orientation region in which a liquid crystal molecule is oriented along a first direction and a plurality of pixels are included;
   a second orientation region in which a liquid crystal molecule is oriented along a second direction intersecting the first direction and a plurality of pixels are included;
   a third orientation region in which a liquid crystal molecule is oriented along a third direction intersecting the second direction and opposite to the first direction and a plurality of pixels are included; and
   a fourth orientation region in which a liquid crystal molecule is oriented along a fourth direction intersecting the third direction and opposite to the second direction and a plurality of pixels are included,
   wherein the first orientation region and the third orientation region are located directly between the second orientation region and the fourth orientation region, and the second orientation region and the fourth orientation region are located directly between the first orientation region and the third orientation region,
   wherein the first direction, the second direction, the third direction, and the fourth direction together correspond to a counterclockwise direction such that the liquid crystal molecule oriented along the first direction is directed toward the second orientation region, the liquid crystal molecule oriented along the second direction is directed toward the third orientation region, the liquid crystal molecule oriented along the third direction is directed toward the fourth orientation region, and the liquid crystal molecule oriented along the fourth direction is directed toward the first orientation region, and the liquid crystal molecules in the first, second, third and fourth orientation regions are circulated through the first, second, third and fourth orientation regions along the counterclockwise direction.

2. A liquid crystal device comprising:
   outside a pixel area,
   a first orientation region in which a liquid crystal molecule is oriented along a first direction, and
   a second orientation region in which a liquid crystal molecule is oriented along a second direction intersecting the first direction;
   in the pixel area,
   a third orientation region in which a liquid crystal molecule is oriented along a third direction intersecting the first direction and the second direction such that the liquid crystal molecule moves from the second orientation region to the first orientation region; and
   outside the pixel area,
   a fourth orientation region in which a liquid crystal molecule is oriented along the first direction, the fourth orientation region being opposed to the first orientation region with the third orientation region interposed between the first orientation region and the fourth orientation region, and
   a fifth orientation region in which a liquid crystal molecule is oriented along the second direction, the fifth orientation region being opposed to the second orientation region with the third orientation region interposed between the second orientation region and the fifth orientation region,
   wherein the third orientation region is adjacent to the first orientation region, the second orientation region, the fourth orientation region, and the fifth orientation region,
   wherein the first direction, the second direction and the third direction together correspond to a first circulation direction in the first, second and third orientation regions such that the liquid crystal molecules are configured to circulate through the first, second and third orientation regions along the first circulation direction, and the second direction, the first direction and the third direction together correspond to a second circulation direction in the fifth, fourth and third orientation regions such that the liquid crystal molecules are configured to circulate through the fifth, fourth and third orientation regions along the second circulation direction.

3. An electronic device comprising the liquid crystal device according to claim 1.

* * * * *